United States Patent [19]

Jones

[11] Patent Number: 4,866,562

[45] Date of Patent: Sep. 12, 1989

[54] SELF-CONTAINED AIR GAP ASSEMBLY

[75] Inventor: Raymond D. Jones, Lindenhurst, N.Y.

[73] Assignee: TII Industries, Inc., St. Copiague, N.Y.

[21] Appl. No.: 148,416

[22] Filed: Jan. 26, 1988

[51] Int. Cl.[4] .................................... H02H 3/22

[52] U.S. Cl. .................................... 361/119; 361/124; 361/129; 337/32

[58] Field of Search .................................... 361/117-120, 361/124, 129, 130; 337/28, 29, 31, 32

[56] References Cited

U.S. PATENT DOCUMENTS

| | | | |
|---|---|---|---|
| 4,132,915 | 1/1979 | Wilms | 361/124 X |
| 4,158,416 | 8/1977 | Gilberts | 361/118 |

*Primary Examiner*—Todd E. DeBoer
*Attorney, Agent, or Firm*—Frank E. Morris

[57] ABSTRACT

A self-contained air gap spark arrester assembly is disclosed which may be constructed and tested prior to its incorporation into a fail-safe surge arrester assembly. The air gap spark arrester assembly comprises a rivet shaped electrode, on which are concentrically mounted an insulating ring, a ring electrode, and an insulating spacer ring. These elements are arranged so as to provide an air gap between the two electrodes, aproximately equal to the thickness of the spacer ring and shielded from particulate contamination. Due to the placement of the assembly's electrodes, it is particularly well suited for combination with gas tube arresters in metal canisters. In one embodiment the canister is of cylindrical form and houses a fusible alloy spacer, a cylindrical gas discharge tube, and the air gap spark arrester assembly. The spark arrester's ring electrode contacts the canister walls, thereby providing a connection to the gas tube's remote electrode, and the rivet electrode provides for a connection to the near electrode of the gas tube. This canister arrangement may be adapted for use in a number of fail-safe surge arrester assemblies.

30 Claims, 4 Drawing Sheets

SELF-CONTAINED AIR GAP ASSEMBLY

BACKGROUND OF THE INVENTION

Gas tube overvoltage protectors are widely used for the protection of electrical equipment from overvoltage conditions which may be caused by electrical surges, lightning, high voltage line contact, and the like. The gas tube is hermetically sealed and usually contains ionizable gas at a pressure lower than atmospheric pressure. At least two electrodes are provided, suitably spaced apart at such a distance that when a voltage connected to the two electrodes reaches a predetermined value, spark-over occurs, the gas ionizes and current flows through the tube.

The gas tube typically is connected to other devices in a fail-safe arrangement to meet various contingencies that may be imposed by a plurality of foreseeable problems. Illustrative of the types of fail-safe protection designs are U.S. Pat. Nos. 3,254,179; 3,281,625; 3,340,431; 3,396,343; 4,150,414; 4,320,435; 4,303,959 and 4,394,704.

For example, in case of a sustained power overload, as where a power line has come in continued contact with the protected line, a concomitant sustained ionization of the gas within the tube is produced. The resultant heavy currents through the tube will cause overheating which, in some cases, could destroy the overvoltage protector and constitute a fire hazard. A common approach to this problem is to employ elements which fuse in the presence of such overloads such as metallic or non-metallic fusible material and provide either a permanent short circuiting of the arrester directly, or function to release another mechanism, e.g., a spring loaded shorting member, which provides the short circuit connection (commonly, the arrester electrodes are both shorted and grounded). The presence of the permanent short across the tube to ground provides a low resistance path to ground to prevent further heating and to limit the voltage at the protected equipment terminals for safety requirements. This ground condition serves also to flag attention to that condition thus signalling the need for its inspection or replacement.

Should a gas tube develop a leak, the ingress of air may cause the spark-over voltage of a tube to increase to an unacceptable level. One method to protect against transient over-voltages, thereby avoiding any damage to the protected lines or equipment, is to electrically connect in parallel with the gas tube discharge path a back-up air gap. The air gap is designed to spark-over at a voltage ("the spark-over voltage") above that of the gas tube across which it is connected and below some critical maximum voltage. For this reason the spacing between electrodes of the air gap must be closely controlled and tested so that spark-over does not occur at a voltage value close to that of the gas tube across which it is fitted. Also an air gap spark arrester assembly is subject to particulate contamination which can affect the value of the spark-over voltage. In addition, since the air gap often is constructed as an integral part of the gas tube assembly, the air gap cannot be tested until the assembly is built. Thus, if the air gap is found to be defective, the gas tube is disassembled and reassembled with a new air gap. This can be a slow and costly process, particularly in large scale manufacturing.

SUMMARY OF THE INVENTION

The present invention is directed to a simplified back-up air gap spark arrester assembly which is easily assembled and tested separate from and prior to its incorporation into a fail-safe surge arrester assembly and which is not affected by subsequent mechanical handling or environmental conditions.

A preferred embodiment of the air gap spark arrester assembly of the present invention comprises a rivet shaped cylindrical electrode on which are concentrically mounted an insulating ring, a ring electrode, and an insulating spacer ring. These elements are arranged so as to provide an air gap between the two electrodes, approximately equal to the thickness of the spacer ring and shielded from particulate contamination which can affect the size of the air gap and thus the spark-over voltage. This construction allows for testing of the air gap spark arrester assembly prior to its incorporation into a fail-safe surge arrester assembly. With the assembly of the present invention, the spark-over voltage can range from 500 to 2000 volts.

Due to the placement of the assembly's electrodes, it is particularly well suited for combination with gas tube arresters in metal canisters. In one embodiment the canister is of cylindrical form and houses a fusible alloy spacer, a cylindrical gas discharge tube, and the air gap spark arrester assembly. The ring electrode of the air gap assembly is arranged to be in contact with the canister walls, thereby providing a connection to the gas tube's remote electrode, and the rivet shaped electrode provides for a connection to the adjacent electrode of the gas tube. This canister arrangement may be adapted for use in a number of fail-safe surge arrester assemblies.

BRIEF DESCRIPTION OF THE DRAWINGS

These and other objects, features and advantages of the invention will become more readily apparent with reference to the following description of the invention in which.

DETAILED DESCRIPTION OF THE DRAWINGS

Figure 1:
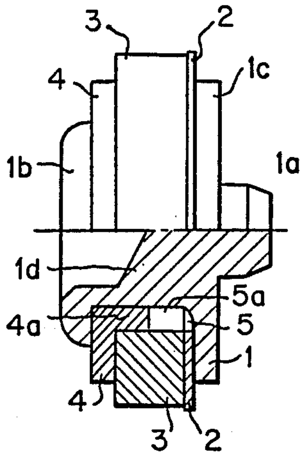
FIG. 1 is a side elevational view, partially in cross-section, of a self-contained air gap spark arrester assembly of the present invention.

FIG. 1 shows a self-contained air gap spark arrester assembly which includes a conductive cylindrical electrode 1, having a shank portion ld and a laterally extending flange 1c at one end. The flange may be provided with an extension 1a to locate the electrode coaxially with the device to which it is attached. Other location means, such as a rim on the flange may be provided. At the other end of the shank section of the electrode, a tubular section 1b is provided which is riveted over to secure the assembly. The cylindrical electrode 1 concentrically mounts a sub-assembly comprising an insulating spacer ring 2, a conductive ring electrode 3, and an annular insulating ring 4 to maintain the concentricity of ring electrode 3 with the shank of the cylindrical electrode. The assembly is arranged such that the spacer ring 2 is adjacent to the lateral flange 1c of the cylindrical electrode 1 and the conductive ring electrode 3 is located between the insulating spacer ring 2 and the circular insulating ring 4. The tubular section of the cylindrical electrode is riveted over at 1b onto insulating ring 4 which secures the subassembly.

The inside diameter or width of the insulating spacer ring 2 and the conductive ring electrode 3 are approximately equal to each other and greater than the diameter or width of the shank of the cylindrical electrode. The circular insulating ring 4 has an inside diameter approximately equal to the diameter or width of the cylindrical electrode shank and is flanged at one end 4a, to allow concentric mating with the inside diameter or width of the ring electrode 3.

An air gap 5, approximately equal to the thickness of the insulating spacer ring 2 (typically 0.003 inches), is evident between the flanged portion 1c of the cylindrical electrode 1 and the ring electrode 3. The air space 5a is of sufficient size to accommodate some particulate contamination without affecting the spark-over voltage of the gap. The concentricity of all the components of the sub-assembly about the shank of the cylindrical electrode 1 insures that sparkover will occur over the edge of the insulating spacer in the air gap 5 between the face of the flanged portion 1c of the cylindrical electrode 1 and the edge of ring electrode 3.

The cylindrical and ring electrodes are of suitable material such as copper which may be plated with a conductive material, such as tin, such that under high fault current the metal at the point where an arc is formed will melt and bridge to form a short circuit.

Figure 2:
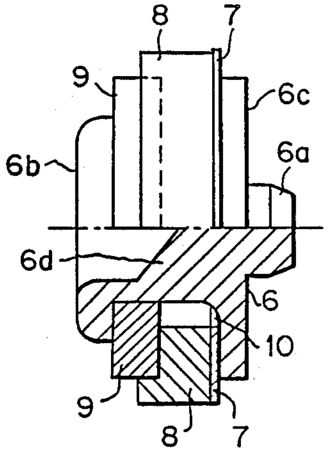
FIG. 2 is a side elevational view, partially in cross-section, of a second embodiment of a self-contained air gap spark arrester assembly of the present invention.

FIG. 2 shows another embodiment of the self-contained air gap spark arrester assembly. The configuration is similar to that illustrated in FIG. 1. A conductive cylindrical electrode 6, has a shank 6d with a laterally extending flange 6c and an optional extension 6a at one end of the electrode. At the opposite end of the electrode there is a tubular section 6b which can be riveted over. On cylindrical electrode 6 is concentrically mounted a subassembly comprising an insulating spacer ring 7, a conductive ring electrode 8, and a circular insulating ring 9. As in FIG. 1, an air gap is evident between the flanged portion 6c of the cylindrical electrode 6 and the ring electrode 8 which is approximately equal to the thickness of the spacer ring 7 (typically 0.003 inches).

The inside diameters or widths of the spacer ring 7 and the ring electrode 8 are approximately equal to each other and greater than the diameter or width of the shank portion of the cylindrical electrode. However, the ring electrode 8 is stepped or notched so as to allow it to concentrically mate with the outside diameter or width of the insulating ring 9. The inside diameter or width of the insulating ring 9 is approximately equal to the diameter or width of the shank of the cylindrical electrode. This arrangement maintains the concentricity of the sub-assembly about the cylindrical electrode and assures that spark-over between the two electrodes will occur over the edge of the spacer ring 7 at the air gap 10.

Figure 3:
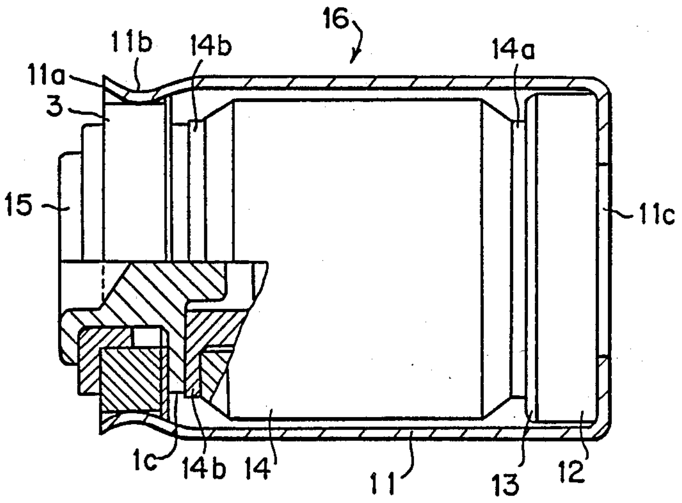
FIG. 3 is a side elevational view, partially in cross-section, of the self-contained air gap spark arrester assembly of FIG. 1 and a gas tube arrester in a canister assembly.

The air gap assembly is particularly well suited for combination with gas tube arresters in a canister assembly 16 such as the cylindrical embodiment shown in FIG. 3. A canister 11, shown in section, houses a fusible alloy spacer, or pellet, 12, an optional metal disc or washer 13, a gas tube 14, and an air gap spark arrester assembly 15 such as that shown in FIGS. 1 or 2. The canister is made of a conductive material, is generally cylindrical in shape and has an opening at one end 11a (the left side in FIG. 3) large enough to house the gas tube and air gap assembly. Advantageously, as described below, such open end has a somewhat smaller diameter neck opening 11a. At the other end of canister 11 is a hole 11c whose function is described below. The alloy spacer 12 is fabricated from an alloy with a melting point suited to allow the spacer to act as a fail-safe system during periods of prolonged over-voltage. The metal disc or washer 13, when utilized, is interposed between a remote electrode 14a of the gas tube 14 and the fusible alloy spacer 12 to regulate the rate of heat transfer from the remote end, or base of the tube 14 to the fusible alloy spacer 12. The gas tube may be a conventional device such as the various gas tubes manufactured by TII Industries, Inc. of Copiague, N.Y. Air gap spark arrester assembly 15 is assembled, tested and fitted to canister 11 so that ring electrode 3 of the air gap assembly makes a slidable electrical contact with the neck opening 11b of canister 11 which provides an electrical connection between the ring electrode of the air gap assembly 15 and the remote electrode 14a of the gas tube 14 located adjacent to spacer 12 or washer 13 when fitted. Simultaneously, the flanged end (1c in FIG. 1; 6c in FIG. 2) of the cylindrical electrode of the air gap assembly 15 is brought into contact with a near electrode 14b of the gas tube 14. Thus the air gap assembly 15 is easily connected electrically in parallel with the gas tube 14.

Figure 5:
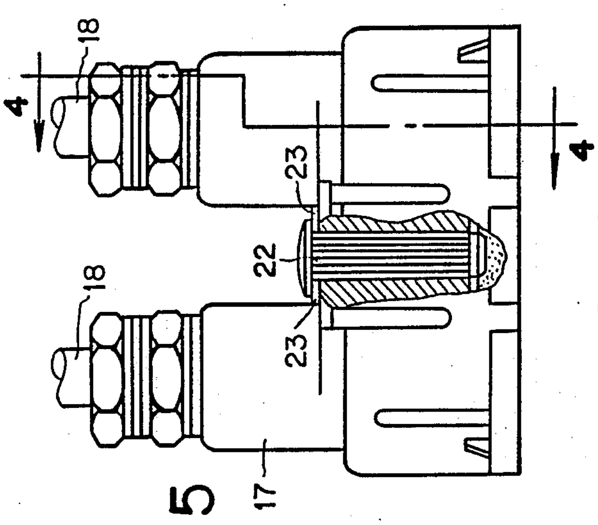
FIG. 5 is a front elevational view, partially in cross-section, of the device shown in FIG. 4.
Figure 6:
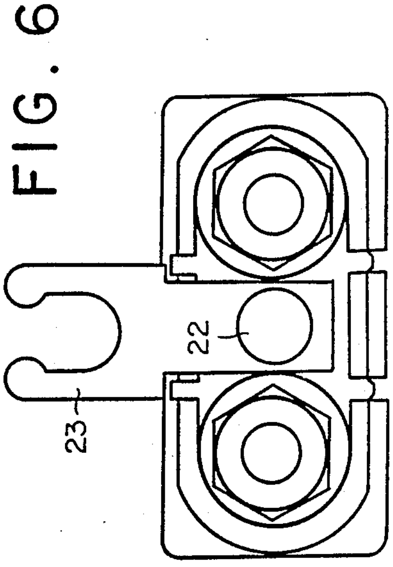
FIG. 6 is a top plan view of the device shown in FIG. 4.
Figure 4:
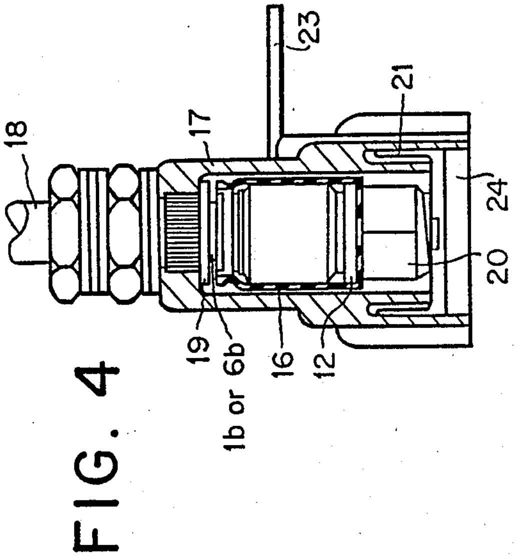
FIG. 4 is a side elevational view, in cross-section, of a device in which is used the canister assembly of FIG. 3.

FIGS. 4–6 illustrate a device that utilizing the cylindrical canister assembly 16 of a gas tube protector, a parallel back-up air gap spark arrester assembly and a fusible alloy spacer 12. An insulating body 17 houses at least two canister assemblies 16, one associated with each of two terminal studs 18, which are secured against rotation in the upstanding cylindrical bases of the insulating body. A head 19 of terminal stud 18 serves to make contact with the rivet portion (1b in FIG. 1; 6b in FIG. 2) of the air gap spark arrester assembly of the present invention which is held in contact with head 19 by the pressure exerted upon the canister assembly 16 by a spring 20 which is held in compression by a cover plate 21. Cover plate 21 also serves as a single, common ground connection for the canister assemblies 16 and is electrically connected to external ground plate 23 by a conductive rivet 22. The external ground plate 23 may be configured as shown to enable the entire electrically connected assembly to be secured to a metal stud which would serve as a connection terminal for ground wiring. The remaining space 24 in the base of the insulating body 17 may be filled with a sealing compound, such as epoxy. The cover plate 21 is shaped to fit closely into the insulating body 17 to prevent the entry of the sealing compound into the cavities containing the canister assemblies 16 and springs 20.

In use, each terminal 18 is connected to one incoming wire of the system to be protected. Each gas tube, and its associated parallel air gap assembly, is therefore connected between the incoming lines and ground so that voltage surges above spark-over voltage of the gas tube will be given a path to ground through the gas tube. If the gas tube fails, due to a damaged hermetic seal or other such problem, the parallel air gap will then provide an alternate path for the voltage surge to reach ground.

In the event of a sustained high voltage, such as one caused by contact between the protected line and high voltage electrical transmission lines, the tube and canister assembly 16 may overheat due to prolonged power dissipation. At such a time when the temperature of the tube electrode and the canister assembly reaches the melting temperature of the fusible alloy spacer 12, the spacer will melt and disperse. The dispersion is preferably assisted by a hole 11*c* placed in the base of the canister assembly. The open end 11*a* of canister 11 of canister assembly 16 will then be moved into electrical contact with the head 19 of the terminal stud 18 due to pressure exerted by spring 20. In this position the canister provides a direct low resistance connection between the line attached to terminal stud 18 and ground through cover plate 21, rivet 22, and external ground plate 23.

Figure 7A:
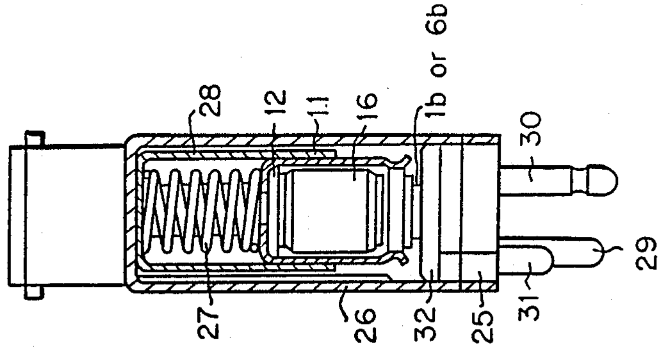
FIG. 7A is a front elevation view, in partial cross-section, of an alternate device incorporating the canister assembly of FIG. 3.
Figure 7B:
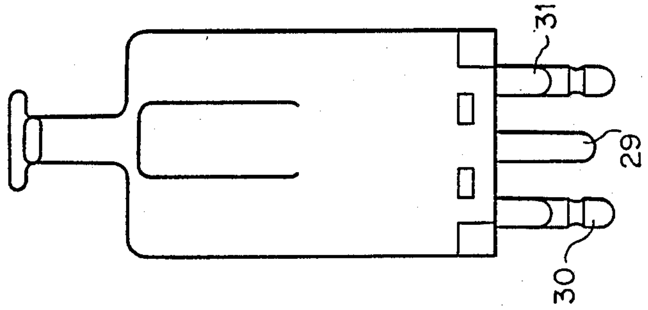
FIG. 7B is a side elevational view of the device FIG. 7A.

Another application of the cylindrical canister assembly 16 is illustrated in FIGS. 7A and 7B. FIG. 7A shows a sectional view of a surge protector assembly having two canister assemblies and provided with five contact pins 29, 30 and 31 which mate with well known socket assemblies used, for example, on main distribution frames in the telephone industry. FIG. 7B is a side elevational view showing the placement of two pairs of contact pins, one short pair 31 and one long pair 30 as well as a center contact pin 29 that is used to contact a ground socket.

The five contact pins are mounted in an insulating base 25. Two contact plates 32 are secured, one to each pair of pins 30 and 31, by riveting the ends of the pins to the respective contact plate. In the arrangement shown, the ground pin 29 extends to the top of the assembly where it is connected into the base of a contact member 28 which is formed to make a slidable contact with each of the canister assemblies 16 positioned over each contact plate 32, as shown in FIG. 7A. A spring 27 is positioned between the base of contact member 28 and each of the canister assemblies 16 so that the rivet contact 1*b* or 6*b* of each air gap assembly contained therein is forced into contact with its respective contact plate 32.

As in the previously described embodiment, illustrated in FIGS. 4–6, each of the gas tubes, and its associated parallel air gap assembly, is connected between the incoming lines and ground so that voltage surges may be given a path to ground. Similarly, in the event of a sustained high energy fault the fusible alloy spacer 12 i.e., the pellet within the canister assembly 16 melts. The pressure of spring 27 will then press the open end of canister 11 of canister assembly 16 into contact with contact plate 32, thus providing a low resistance path between the contact pins 30 or 31 and the ground pin 29.

Figure 8:
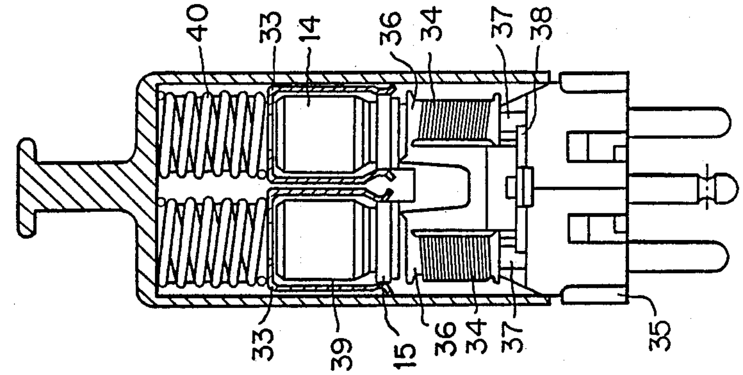
FIG. 8 is a front elevational view, in cross-section, of a device employing two canister assemblies of FIG. 3 and two heat coils.

Another application for the use of the canister assembly containing the air gap spark arrester assembly of the present invention is shown in FIG. 8. Here, assemblies 33, each comprising a gas tube 14 and parallel air gap 15 as in FIG. 3, are contained within a canister 39 in a manner similar to that described in the previously mentioned embodiments, except that these assemblies 33 do not contain fusible alloy spacers. As illustrated, a one or two piece insulating base 35 retains two long and two short contact pins and a ground contact pin. At the opposite end of each long contact pin there is an internal contact pin 37. Two heat coil assemblies 34 each comprise a resistance wire coil wound on an electrically conductive sleeve 36 which is soldered to the internal contact pin 37 with a low temperature solder alloy which melts when the coil assembly 34 becomes overheated. The ground pin is connected to the ground plate 38 which contacts canisters 39. A spring 40 is positioned so as to provide pressure upon the assemblies 33, such that when sufficient heat is generated by a sustained fault current through the heat coil, gas tube or air gap the low temperature solder is caused to melt. Movement of sleeve 36 on contact pin 37 will then occur and cause a short circuit between contact pin 37 and ground when sleeve 36 makes contact with the ground plate 38, thus providing failsafe protection.

Figure 9:
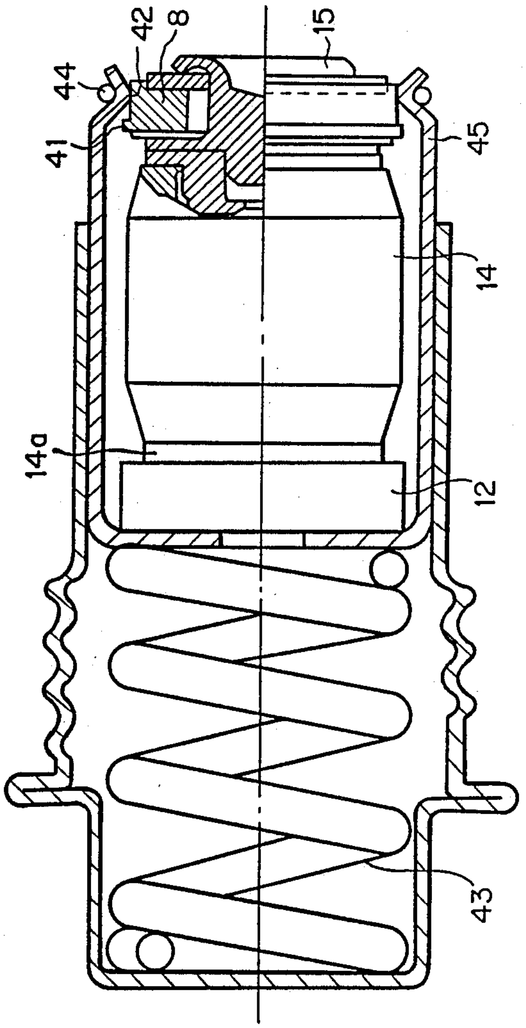
FIG. 9 is a side elevational view, in cross-section, of the self-contained air gap spark arrester assembly of the present invention in a screw-in cartridge type gas tube surge protector assembly.

FIG. 9 shows an application of the device of the present invention to an assembly of a conventional screw-in cartridge type protector unit where the gas tube 14, fusible alloy spacer 12, and an air gap assembly 15 are contained within a basket cage 45 in which the connection between a ring electrode 8 of the air gap assembly and the remote electrode of the gas tube 14 is accomplished by shaped fingers 42 of said basket cage. When the unit is screwed into a base, the air gap assembly is held in contact with the gas tube electrodes by the pressure of a spiral spring 43. Prior to assembly in the base, it is desirable that the air gap assembly be retained in place within the basket cage. This is ensured by securing the air gap assembly to the gas tube by conventional means such as with an electrically conducting adhesive. An alternate method of ensuring that the air gap will not fall out of position is to shape the outside surface of the air gap ring electrode 8 with a stop or rim 41 that is trapped within the shaped ends of the fingers 42. In addition it is advantageous to fit a ring 44 around the basket cage fingers 42 thereby insuring against any outward movement. In similar fashion, a stop or rim on the air gap ring electrode can be used to trap the ring electrode in the neck opening 11*b* of canister 11 of FIG. 3.

While the invention has been described in conjunction with specific embodiments, it is evident that numerous alternatives, modifications, variations and uses will be apparent to those skilled in the art in light of the foregoing description. For example, the orientation of the springs and canisters with respect to the ground and line connections could be reversed in the apparatus of FIGS. 4–8 or the springs could be mounted so they engage the spark arrester assembly rather than the canister. With respect to the spark arrester assembly, components having other shapes can be used in place of the cylindrical and annular components depicted in FIGS. 1 and 2; and tubular or hollow structures can be used in place of solid structures. While the elements of the spark arrester assembly shown in FIGS. 1 and 2 are secured by a rivet, other fastening means will also be apparent to those skilled in the art in view of the foregoing disclosure. For example, a T-shaped snap-on cap or conical shaped washer may be mounted on the shank portion 1*d* of the cylindrical electrode with the vertical center stem of the T engaging the shank portion and the horizontal arms bearing against insulating ring 4 or 9.

What is claimed is:

1. A self-contained air gap spark arrester assembly comprising a conductive cylindrical electrode, having a shank portion having a first end a second end, a laterally extending flange at said first end and a rivet portion at said second end, and concentrically mounted on said shank portion a stacked assembly comprising:

(i) an insulating spacer ring having an inside diameter greater than the outer diameter of the shank portion of the cylindrical electrode, said insulating spacer ring being located adjacent to the laterally extending flange of the cylindrical electrode;

(ii) a conductive ring electrode located adjacent to said insulating spacer ring, having an inside diameter approximately equal to that of the insulating spacer ring; and (iii) an annular insulating ring having an inside diameter approximately equal to the outer diameter of the shank portion of said cylindrical electrode, a portion of said annular insulating ring being interposed between said conductive ring electrode and said shank portion;

the opposite second end of the shank portion being riveted over said annular insulating ring to secure the assembly;

whereby an air gap approximately equal to the thickness of said insulating spacer ring is defined between said conductive ring electrode and the laterally extending flange of said cylindrical electrode and sparkover will occur over the edge of the said insulating spacer ring.

2. The self-contained air gap spark arrester assembly of claim 1 wherein said annular insulating ring comprises a flange at one end of the annular insulating ring that concentrically mates with the inside diameter of the conductive ring electrode to hold the conductive ring electrode concentric with said shank portion.

3. The self-contained air gap spark arrester assembly of claim 1 wherein said conductive ring electrode comprises a notch at one end of the conductive ring electrode that concentrically mates with the outer diameter of the annular insulating ring to hold the conductive ring electrode concentric with said shank portion.

4. The self-contained air gap spark arrester assembly of claim 1, wherein said insulating spacer ring has a thickness of approximately 0.003 inches.

5. The self-contained air gap spark arrester assembly of claim 1 wherein said shank portion is tubular or cylindrical.

6. The self-contained air gap spark arrester assembly of claim 1 wherein said ring electrode comprises a stop or a rim as part of a means for retention of the self contained air gap spark arrester assembly in a basket cage or canister.

7. The self-contained air gap spark arrester assembly of claim 1 wherein said assembly is utilized in a surge protector canister assembly comprising a gas tube protector and the self-contained air gap spark arrester assembly.

8. The self-contained air gap spark arrester assembly of claim 7 wherein said surge protector canister assembly further comprises a fusible alloy spacer.

9. The self-contained air gap spark arrester assembly of claim 1 wherein said assembly is utilized in a surge protector canister assembly comprising two canisters, constructed in parallel, each canister comprising a gas tube protector and the self-contained air gap spark arrester assembly.

10. The self-contained air gap spark arrester assembly of claim 9 wherein each canister of the surge protector canister assembly further comprises a fusible alloy spacer.

11. The self-contained air gap spark arrester assembly of claim 1 wherein said assembly is used as a means for back-up protection in a gas tube electrical over-voltage protector for protecting equipment from voltage surges.

12. The arrester assembly of claim 11, wherein the range of the spark-over voltage is about 500 to 2000 volts.

13. A self-contained air gap spark arrester assembly comprising a first electrode having a shank portion having a first end and a second end, a laterally extending flange at said first end and a fastening means at said second end, and concentrically mounted on said shank portion a stacked sub-assembly comprising:

(i) a first insulating spacer having an inside width greater than the width of the shank portion of the first electrode, said insulating spacer being located adjacent to the laterally extending flange of the first electrode;

(ii) a second electrode located adjacent to said first insulating spacer, having an inside width approximately equal to that of the first insulating spacer; and (iii) a second insulating spacer having an inside width approximately equal to the width of the shank portion of the first electrode, a portion of said second insulating spacer being interposed between said second electrode and said shank portion;

the fastening means at the second end of said first electrode extending over said second insulating spacer to secure the assembly, whereby an air gap approximately equal to the thickness of said first insulating spacer is defined between said second electrode and the laterally extending flange of said first electrode and sparkover will occur over the edge of said first insulating spacer ring.

14. The self-contained air gap spark arrester assembly of claim 13 wherein said second insulating spacer comprises a flange at one end that concentrically mates with the inside width of the second electrode to hold the second electrode concentric with the shank portion.

15. The self-contained air gap spark arrester assembly of claim 13 wherein said second electrode comprises a notch at one end of the second electrode that concentrically mates with the outer width of the second insulating spacer to hold the second electrode concentric with the shank portion.

16. The self-contained air gap spark arrester assembly of claim 13 wherein said shank is tubular or cylindrical.

17. The self-contained air gap spark arrester assembly of claim 13 wherein said second electrode comprises a stop or a rim as part of a means for retention of the self contained air gap spark arrester assembly in a basket cage or canister.

18. The self-contained air gap spark arrester assembly of claim 13 wherein said first insulating spacer has a thickness of approximately 0.003 inches.

19. The self-contained air gap spark arrester assembly of claim 13 wherein said assembly is used as a means for back-up protection in a gas tube electrical over-voltage protector for protecting equipment from voltage surges.

20. The self-contained air gap spark arrester assembly of claim 19 wherein the range of the spark-over voltage is about 500 to 2000 volts.

21. The self-contained air gap spark arrester assembly of claim 13 wherein said assembly is utilized in a surge protector canister assembly comprising a gas tube protector and the self-contained air gap spark arrester assembly.

22. The self-contained air gap spark arrester assembly of claim 21 wherein said surge protector canister assembly further comprises a fusible alloy spacer.

23. The self-contained air gap spark arrester assembly of claim 13 wherein said assembly is utilized in a surge protector canister assembly comprising two canisters, constructed in parallel, each canister comprising a gas tube protector and the self-contained air gap spark arrester assembly.

24. The self-contained air gap spark arrester assembly of claim 23 wherein each canister of the surge protector canister assembly further comprises a fusible alloy spacer.

25. A fail-safe surge arrester assembly comprising:

a canister in which the assembly is housed having a first opening at one end of the canister and a second opening at the other end of the canister, said canister being made of a conductive material;

a fusible alloy spacer situated inside the canister in contact with the second opening of said canister, said fusible alloy spacer being fabricated from an alloy with a melting point such that the spacer melts during periods of prolonged over-voltage;

a gas tube arrester assembly situated inside the canister, said gas tube having a first electrode at one end of the gas tube and a second electrode contacting said fusible alloy spacer;

a self-contained air gap spark arrester assembly comprising a first electrode having a shank portion having a first end and a second end, a laterally extending flange at said first end and a fastening means at said second end, and concentrically mounted on said shank portion a stacked assembly comprising:

(i) a first insulating spacer having an inside width greater than the width of the shank portion of the first electrode, said insulating spacer being located adjacent to the laterally extending flange of the first electrode;

(ii) a second electrode located adjacent to said first insulating spacer, having an inside width approximately equal to that of the first insulating spacer; and (iii) a second insulating spacer having an inside width approximately equal to the width of the shank portion of the first electrode, a portion of said second insulating spacer being interposed between said second electrode and said shank portion;

the fastening means at the second end of the first electrode extending over said second insulating spacer to secure the assembly, whereby an air gap approximately equal to the thickness of said first insulating spacer is defined between second electrode and the laterally extending flange of said first electrode and spark-over will occur over the edge of said first insulating spacer, said self-contained air gap spark arrester assembly being situated inside the canister such that said spark arrester second electrode makes slidable electrical contact with the first opening of the canister, and the flanged end of said spark arrester first electrode is brought into contact with said first electrode of the gas tube, thus connecting in parallel the self-contained air gap spark arrester assembly with the gas tube, the fastening means and the canister being connected between the line to be protected and ground wherein during a period of prolonged over-voltage, the fusible alloy spacer melts and the air gap spark arrester assembly and the gas tube arrester assembly move relatively toward said second opening of said canister whereby the canister is connected between the line to be protected and ground.

26. The fail-safe surge arrestor assembly of claim 25 further comprising:

a housing within which the canister is located;

a terminal stud located within the housing, adjacent to the first opening of the canister, connected to the line to be protected and contacting the fastening means of the first electrode; and a spring located within the housing between the second opening of the canister and an electrical contact to ground, said spring being made of a conductive material;

whereby upon prolonged over-voltage the fusible alloy spacer melts and the spring urges the canister into contact with the terminal stud, thereby connecting the line to be protected to ground through the canister.

27. A self-contained air gap spark arrester assembly comprising a conductive cylindrical electrode, having a shank portion having a first end and a second end, a laterally extending flange at said first end and a rivet portion at said second end, and concentrically mounted on said shank portion a stacked assembly comprising:

(i) an insulating spacer ring having an inside diameter greater than the outer diameter of the shank portion of the cylindrical electrode, said insulating spacer ring contacting the laterally extending flange of the cylindrical electrode;

(ii) a conductive ring electrode located adjacent to said insulating spacer ring, having an inside diameter approximately equal to that of the insulating spacer ring;

(iii) an annular insulating ring having an inside diameter approximately equal to the outer diameter of the shank portion of said cylindrical electrode; and (iv) a flange at one end of the annular insulating ring that concentrically mates with the inside diameter of the conductive ring electrode to hold the conductive ring electrode concentric with said shank portion;

the second end of the shank portion being riveted over said annular insulating ring to secure the assembly;

whereby an air gap approximately equal to the thickness of said insulating spacer ring is defined between said conductive ring electrode and the flanged portion of said cylindrical electrode.

28. A self-contained air gap spark arrester assembly comprising a conductive cylindrical electrode, having a shank portion having a first end and a second end, a laterally extending flange at said first end and a rivet portion at said second end, and concentrically mounted on said shank portion a stacked assembly comprising:

(i) an insulating spacer ring having an inside diameter greater than the outer diameter of the shank portion of the cylindrical electrode, said insulating spacer ring being located adjacent to the laterally extending flange of the cylindrical electrode;

(ii) a conductive ring electrode located adjacent to said insulating spacer ring, having an inside diameter approximately equal to that of the insulating spacer ring;

(iii) an annular insulating ring having an inside diameter approximately equal to the outer diameter of the shank portion of said cylindrical electrode; and (iv) a notch at one end of the conductive ring electrode that concentrically mates with the outer diameter of the annular insulating ring to hold the conductive ring electrode concentric with said shank portion;

the second end of the shank portion being riveted over said annular insulating ring to secure the assembly;

whereby an air gap approximately equal to the thickness of said insulating spacer ring is defined between said conductive ring electrode and the flanged portion of said cylindrical electrode.

29. A self-contained air gap spark arrester assembly comprising a first electrode having a shank portion having a first end and a second end, a laterally extending flange at said first end and a fastening means at said second end, and concentrically mounted on said shank portion a stacked sub-assembly comprising:

(i) a first insulating spacer having an inside width greater than the width of the shank portion of the first electrode, said insulating spacer contacting the laterally extending flange of the first electrode;

(ii) a second electrode located adjacent to said first insulating spacer, having an inside width approximately equal to that of the first insulating spacer;

(iii) a second insulating spacer having an inside width approximately equal to the width of the shank portion of the first electrode; and (iv) a flange at one end of said second insulating spacer that concentrically mates with the inside width of the second electrode to hold the second electrode concentric with the shank portion;

the fastening means at the second end of said first electrode extending over said second-insulating spacer to secure the assembly;

whereby an air gap approximately equal to the thickness of said first insulating spacer is defined between said second electrode and the flanged portion of said first electrode.

30. A self-contained air gap spark arrester assembly comprising a first electrode having a shank portion having a first end and a second end, a laterally extending flange at said first end and a fastening means at said second end, and concentrically mounted on said shank portion a stacked sub-assembly comprising:

(i) a first insulating spacer having an inside width greater than the width of the shank portion of the first electrode, said insulating spacer being located adjacent to the laterally extending flange of the first electrode;

(ii) a second electrode located adjacent to said first insulating spacer, having an inside width approximately equal to that of the first insulating spacer;

(iii) a second insulating spacer having an inside width approximately equal to the width of the shank portion of the first electrode; and (iv) a notch at one end of the second electrode that concentrically mates with the outer width of the second insulating spacer to hold the second electrode concentric with the shank portion;

the fastening means at the second end of said first electrode extending over said second insulating spacer to secure the assembly;

whereby an air gap approximately equal to the thickness of said first insulating spacer is defined between said second electrode and the flanged portion of said first electrode.

* * * * *